METHOD FOR DAMPENING VIBRATIONS IN FERRITE CORES AND PRODUCTS

Filed June 28, 1963

A_ UNCOATED CORES (PEAK AMPLITUDES AT SUB-HARMONICS)

B_ COATED CORES (CONSTANT AMPLITUDES FOR ALL FREQ.)

INVENTORS
ROBERT S. HAINES
THOMAS J. WALSH
BY
Sughrue, Rothwell, Mion & Zinn
ATTORNEYS United States Patent Office
3,279,945
Patented Oct. 18, 1966

3,279,945
METHOD FOR DAMPENING VIBRATIONS IN FERRITE CORES AND PRODUCTS

Robert S. Haines and Thomas J. Walsh, Poughkeepsie, N.Y., assignors to International Business Machines Corporation, New York, N.Y., a corporation of New York
Filed June 28, 1963, Ser. No. 291,330
9 Claims. (Cl. 117—161)

The present invention relates to magnetic cores and memory arrays comprising a plurality of such cores. More specifically, the invention is concerned with magnetic cores and memory arrays having reduced magnetostrictive ringing or resonance when operated at high speeds and with methods for accomplishing a reduction in magnetostrictive effects caused by high speed operation Magnetostrictive ringing is encountered in the operation of magnetic memory arrays at high speeds. The magnetostrictive effects caused by high speed operation of the cores in a matrix frequently set up vibrations which cause oscillations in the sense lines following the application of driving pulses.

It has previously been suggested that magnetostrictive ringing or resonance might be reduced by the application to the individual cores of a thin, flexible, plastic coating to dampen the vibrations. In IBM Technical Disclosure Bulletin, vol. 4, No. 1, June 1961, it was disclosed that polyacrylate materials applied from a toluene solution produced thin coatings on ferrite cores which have some value in reducing or dampening the vibrations set up during high speed operation of magnetic memory arrays. After further work with such materials, however, it was found that polyacrylate coatings did not sufficiently dampen the vibrations to reduce oscillations in the sense lines to the desired low level.

In an effort to overcome this problem, considerable effort has been devoted to the development of coating materials which will satisfactorily dampen the vibrations arising from magnetostrictive resonance and which will also possess the other properties so necessary in such a coating. In addition to the ability to dampen vibrations, the coating must also be non-tacky so as not to pick up dust or other foreign matter which would interfere with the core operation. The coating must also be stable on aging and at the temperatures of operation of the memory array, so that it does not become tacky or fluid or otherwise deteriorate or lose its dampening capacity. Such a coating must also be capable of enveloping a ferrite core without straining the core, since mechanical strains induced by a coating will adversely effect the magnetic properties of the core and render it inoperable in the assembly.

The search for a suitable dampening coating for ferrite cores has led to the testing of a wide variety of materials such as polyisobutylene, uncured butyl rubber, uncured styrene-butadiene rubber, silicone oils, tricresyl phosphate, vinyl alcohols, and various polyester and polyacrylic resins. For one or more reasons all of the foregoing materials were found to be unsatisfactory. Many do not contribute the necessary dampening effect, while others fail on the basis of temperature stability, aging, strain inducement, tackiness, or the like.

It is therefore an object of the present invention to provide a method and composition for dampening vibrations arising in magnetic core arrays during high speed operation.

A further object of the present invention is to provide a ferrite core characterized by low level, tolerable vibrations when operated at high speeds in a magnetic array.

A further object of the present invention is to provide a magnetic memory array comprising a plurality of ferrite cores having negligible vibration at high speed operations.

Other objects and advantages of the present invention will become apparent in view of the following detailed description considered in the light of the accompanying drawings which represent, by way of illustration, a preferred embodiment and the best mode contemplated for carrying out the present invention.

Figure 1:
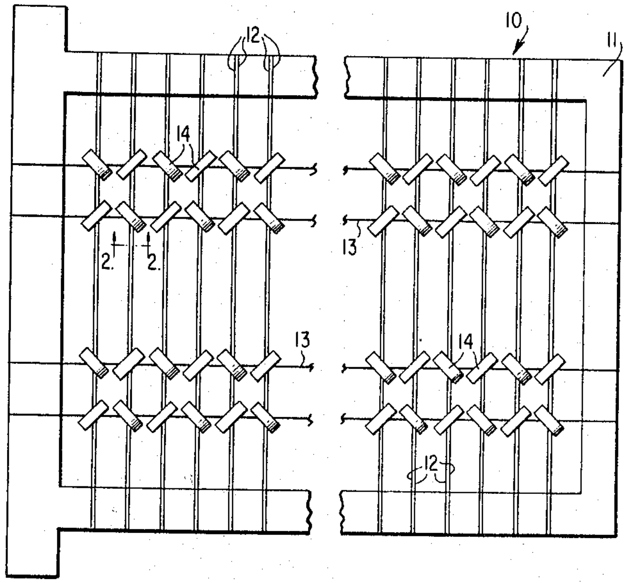
FIG. 1 is a top plan view of a typical magnetic memory array.

In general, the present invention comprises a method for dampening vibrations induced in ferrite cores due to magnetostrictive resonance set up during high speed operation by coating the cores with a composition comprising a polymer of 2,2′ bis (p-hydroxyphenyl propane) and epichlorohydrin, and chlorinated biphenyl. The invention further contemplates ferrite cores coated with this composition and magnetic memory arrays comprising a plurality of such coated cores.

The polymer of 2,2′ bis (p-hydroxyphenyl propane) and epichlorohydrin is a solid with an average molecular weight of 900 to 6500 and an epoxide quivalent (grams of resin containing one gram-equivalent of epoxide) of 400 to 3800.

The polymer of 2,2′ bis (p-hydroxyphenyl propane) and epichlorohydrin used in this invention has the following formula:

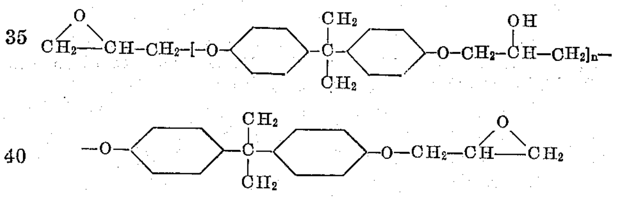

Chlorinated biphenyls of varying degrees of substitution are useful in the invention, such as mono-, di-, tri-, tetra-, pentachlorobiphenyl and the like.

In practice, it has been found preferable to use a mixture, of chlorinated biphenyls. Such compositions are available commercially under the trade name "Aroclors." A preferred composition of this group is "Aroclor 1254." The last two digits indicate the weight percent of chlorine, in this case 54%.

"Aroclor 1254" is a yellow viscous liquid having an acid number of 0.015, a density of 12.83 lbs./gal. at 25° C., a distillation range of 365°–390° C., a pour point of 10 and a refractive index of 1.640.

Other compositions of the "Aroclor" series are also useful, such as "Aroclor 1242," 42% by weight chlorine, and "Aroclor 1248," 48% by weight chlorine. These materials, however, tend to produce a more tacky coating at slightly elevated temperatures.

In the present description, the term chlorinated biphenyl is, therefore, meant to include specific chlorinated biphenyls of varying degrees of substitution and also compositions comprising mixtures of one or more specific chlorinated biphenyl compounds.

The dampening composition is preferably applied as a solution of the polymer of 2,2′ bis (p-hydroxyphenyl propane) and epichlorohydrin and chlorinated biphenyl in a volatile solvent which is evaporated to leave as a residue a coating of the polymer and chlorinated biphenyl.

It has also been found that the proportions of the polymer of 2,2′ bis (p-hydroxyphenyl propane) and epichlorohydrin and the chlorinated biphenyl in the coating solution are critical. If substantially no chlorinated biphenyl is present, a solution containing only the polymer, applied to a core and dried, produce a film or coating which places a strain on the core and adversely affects its magneic properties. On the other hand, if the chlorinated biphenyl is present in an amount greater than 20% by weight of the dry coating, the coating becomes tacky at 40° C., the operational temperature of conventional magnetic memory arrays. It has been found that the chlorinated biphenyl content of the dry film must be between an effective minimum amount of about 3% and a maximum amount of about 20% by weight, the balance being the polymer.

Likewise, the polymer constituent of the composition also preferably is present in an amount within the range of from about 80% to 97% by weight in the dry coating.

The solids may be dissolved in the volatile solvent in any proportion that will produce the desired coating upon evaporation. As a practical matter the solids content of the coating solution generally may range from about 10% to as much as 42%, but the preferred range is from about 10% to 20% by weight of solids.

Any volatile solvent in which both the polymer and chlorinated biphenyl are soluable may be employed according to the invention. Methyl ethyl ketone is a preferred solvent, but other satisfactory solvents include, for example, benzene, toluene, and ketone mixtures.

It has also been found that the coating has optimum properties where the ratio of the polymer to the chlorinated biphenyl is about 5 to 1. A preferred coating solution comprises 15% polymer, 3% chlorinated biphenyl and the balance solvent.

The coating may be applied to individual cores or after the cores have been assembled in an array by dipping the array into a bath of the coating solution. The coated cores are then dried preferably by being placed in an evacuation oven at a temperature of 50° C. for about 25 minutes or in an air circulating oven at about 50° C. for a period of about 60 minutes. The solution may be coated not only on the cores but also on the drive wires passed through the cores and on the array frame without any undersirable effect. In this manner, dampening to about one-tenth the magnitude of magnetostriction of uncoated cores is realized.

It is most important to note that the coating applied in accordance with present invenion essenially is uncured and remains uncured. Being uncured, the coating is sufficiently flexible to dampen the core vibrations. In contract, curing induces rigidity into the coating which in turn inhibits the dampening effect. Further, curing of the coating induces unacceptable mechanical strain in the core.

In view of the importance attached to the uncured state of the coating, one important embodiment of the present invention comprises adding a small but effective amount, generally 1% by weight of the film or less is sufficient, of an anti-oxidant to the composition to prevent curing during aging and various anti-oxidants are known and suitable materials are "Agerite Powder" which is phenyl beta-naphthylamine and hydroquinone monobenzylether.

It has been found that a 10% solution of the polymer gives a smooth coating. Below 10%, the resulting coating is too thin to give sufficient dampening. At concentrations of 20% and above of the polymer, the coating is quite thick and forms webs between cores and wires. While the coating does dampen effectively, the heat transfer and unacceptable increases in capacitance become problems. However, where increase in capacitance is desired, a thicker coating can be used. Therefore, the effective range of the polymer solids in solution is generally from 10% to 20% by weight of the total solution.

While dipping of the cores or array into the coating solution has been found to be a very effective procedure, other coating methods may also be satisfactory, such as spraying of the solution onto the ferrite cores.

Referring in detail to the drawing, FIG. 1 is a top plan view of a magnetic memory array generally designated by numeral 10. The figure is broken in the center to indicate that the size of the array and the number of indivdual cores, and drive lines, is not critical. The array generally comprises a frame 11 which is spanned by a grid of vertical drive lines 12 and horizontal drive lines 13. The vertical and horizontal drive lines intersect within toroidal ferrite cores 14.

In the particular memory array illustrated, a 3-wire system, two vertical and one horizontal drive lines intersect within toroidal ferrite cores 14. This can perhaps be better seen by reference to FIG. 2 which is a side elevational view taken along line 2–2 of FIG. 1. As will be seen, the individual ferrite cores 14 are toroidal in shape and the two vertical drive lines 12 and single horizontal drive line 13 intersect within the central aperture 15 of the core.

Figure 3:
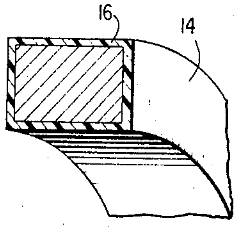
FIG. 3 is a cross-sectional view taken along line 3—3 of FIG. 2.

The dampening effect of the present invention is achieved by depositing on the surface of the cores 14 the residue of a solution comprising the polymer of 2,2′ bis (p-hydroxyphenyl propane) and epichlorohydrin and chlorinated bisphenyl dissolved in a volatile solvent. As will be seen by reference to FIG. 3 of the drawing, a cross-sectional view taken alone lines 3—3 of FIG. 2, the residue of the coating solution deposits a thin film 16 on the surface of the ferrite core 14. The thickness of the film with reference to the dimensions of the core is somewhat exaggerated in the drawing so that the coating will be clearly evident. In practice, a very thin film is adequate, preferably about 1 mil thick. The upper thickness limit of the film is not critical for dampening purposes. However, unacceptable heat transfer conditions and increases in capacitance occur in thicknesses over 2 mils. Coating thicknesses of less than 0.5 mil do not reduce vibrations to an acceptable level. Best result are achieved with thin films having a thickness of from 0.5 mil to 2 mils.

In ordinary operation of the magnetic memory array illustrated in FIG. 1 of the drawing, drive lines 12 and 13 are selectively energized through suitable electrical connections to influence the magnetic state of the ferrite cores. During high speed operations, rapid switching of the cores from one magnetic state to another results in magnetostrictive resonance or ringing which is transformed into vibrations which in turn cause induced voltages and lead to erroneous readings in the sense lines. According to the present invention, however, the vibrations are dampened to about one-tenth the amplitude experienced in uncoated cores without straining the core and so the magnetostrictive ringing is kept to a tolerable minimum.

Figures 2, 4:
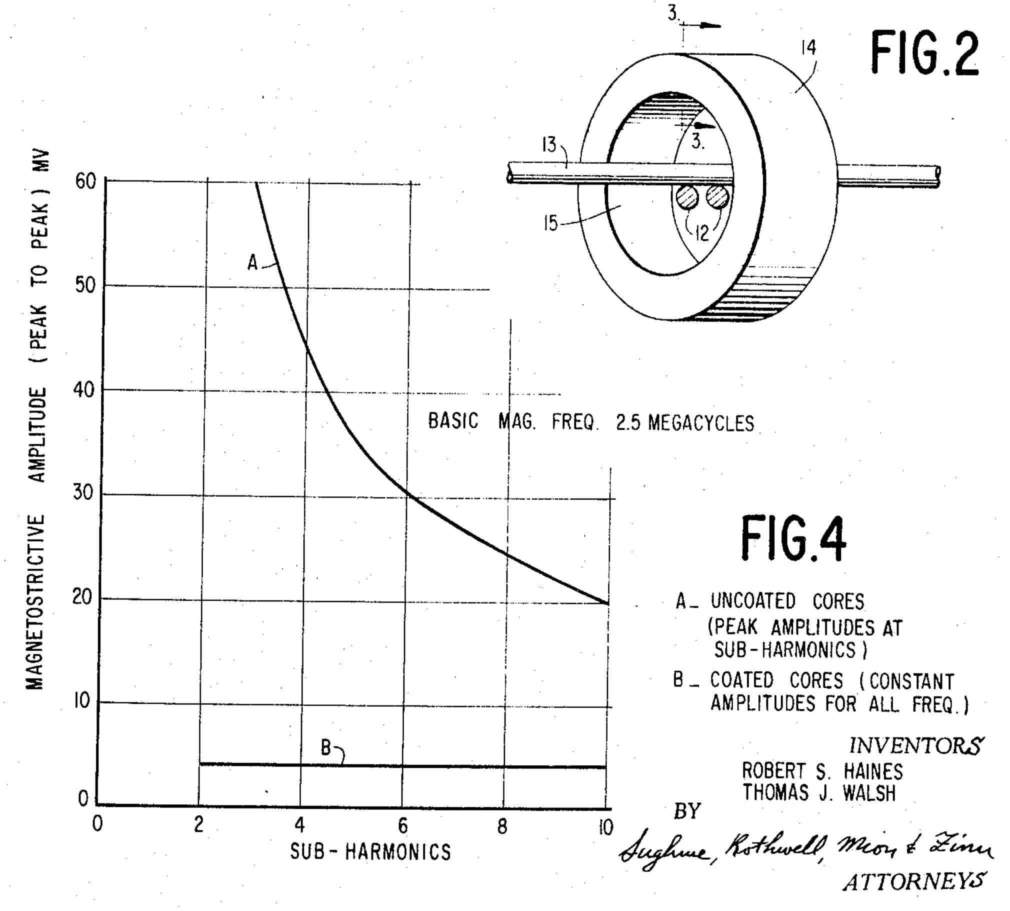
FIG. 2 is a side elevational view taken along line 2—2 of FIG. 1.
FIG. 4 is a graph of magnetostrictive amplitude plotted against sub-harmonic pulse frequency for coated and uncoated cores.

As is graphically illustrated in FIG. 4, ferrite cores pulsed at various sub-harmonic frequencies exhibit consistently lower magnetostrictive amplitudes (peak to peak) when coated with the present compositions than when uncoated. The data used to plot the curves in FIG. 4 were derived from the pulsing of two banks of cores, each containing 256 ferrite cores. The cores of group A were uncoated, and the cores of group B were coated with a solution of 15% of the polymer of 2,2′ bis (p-hydroxyphenyl propane) and epichlorohydrin and 3% chlorinated biphenyl ("Aroclor 1254") in methyl ethyl ketone.

As can be seen, the plot of the magnetostrictive amplitude for the uncoated cores, line A, vs. the various sub-harmonic frequencies of a basic magnetic frequency of 2.5 megacycles reflects much higher values than the coated cores, line B.

The nature and importance of the present invention will perhaps be better understood in the light of the following detailed examples.

*Example 1*

A ferrite core was dip-coated with a solution comprising 10% by weight of the polymer of 2,2' bis (p-hydroxyphenyl propane) and epichlorohydrin, 0.01% by weight of trichlorobiphenyl, and the balance methyl ethyl ketone. The coated core was then dried to remove the volatile solvent by evaporation.

*Example 2*

A ferrite core was dip-coated with a solution comprising 12% by weight of the polymer of 2,2' bis (p-hydroxyphenyl propane) and epichlorohydrin, 0.6% by weight of tetrachlorobiphenyl and the balance benzene. The coated core was then dried to remove the volatile solvent by evaporation.

*Example 3*

A ferrite core was dip-coated with a solution comprising 15% by weight of the polymer of 2,2' bis (p-hydroxyphenyl propane) and epichlorohydrin, 1.2% by weight of "Aroclor 1254" and the balance toluene. The coated core was then dried to remove the volatile solvent by evaporation.

*Example 4*

A ferrite core was dip-coated with a solution comprising 15% by weight of the polymer of 2,2' bis (p-hydroxyphenyl propane) and epichlorohydrin, 1.8% by weight of "Aroclor 1254," 1% by weight of "Agerite Powder" antioxidant and the balance methyl ethyl ketone. The coated core was then dried to remove the volatile solvent by evaporation.

*Example 5*

A ferrite core was dip-coated with a solution comprising 15% by weight of the polymer of 2,2' bis (p-hydroxyphenyl propane) and epichlorohydrin, 2.4% by weight "Aroclor 1248" and the balance methyl ethyl ketone. The coated core was then dried to remove the volatile solvent by evaporation.

*Example 6*

A ferrite core was dip-coated with a solution comprising 15% by weight of the polymer of 2,2' bis (p-hydroxyphenyl propane) and epichlorohydrin, 3.0% by weight "Aroclor 1254" and the balance methyl ethyl ketone. The coated core was then dried to remove the volatile solvent by evaporation.

*Example 7*

A ferrite core was dip-coated with a solution comprising 15% by weight of the polymer of 2,2' bis (p-hydroxyphenyl propane) and epichlorohydrin, 3.0% by weight "Aroclor 1254," 1% by weight of "Agerite Powder" antioxidant, and the balance methyl ethyl ketone. The coated core was then dried to remove the volatile solvent by evaporation.

*Example 8*

A ferrite core was dip-coated with a solution comprising 17% by weight of the polymer of 2,2' bis (p-hydroxyphenyl propane) and epichlorohydrin, 3.0% by weight "Aroclor 1254" and the balance methyl ethyl ketone. The coated core was then dried to remove the volatile solvent by evaporation.

*Example 9*

A ferrite core was dip-coated with a solution comprising 20% by weight of the polymer of 2,2' bis (p-hydroxyphenyl propane) and epichlorohydrin, 3.0% by weight "Aroclor 1254" and the balance methyl ethyl ketone. The coated core was then dried to remove the volatile solvent by evaporation.

In the above examples, at 20% of the polymer (Example 9), the coating applied to ferrite cores which had already been threaded with drive lines resulted in a film which spanned the drive lines and the cores with a web of coating material. The film also tended to be thicker and less uniform than those obtained with lower percentages of the polymer.

It has been found that optimum coating is obtained with a solution which deposits a residue containing about 83.3% polymer and 16.7% chlorinated biphenyl. Films containing from 80% to 97% polymer and from 3% to 20% chlorinated biphenyl are quite satisfactory.

Where substantially no chlorinated biphenyl is included in the composition, the resulting residue or film is found, upon testing of the cores, to strain and adversely affect the magnetic characteristics of the core. Likewise, when the polymer solids content of the solution is below about 10% by weight of the solution, the resultant film is generally too thin, less than 0.5 mil thick, to dampen vibrations effectively.

*Example 10*

A bank or array of 256 ferrite cores was coated with a composition comprising 15% by weight of the polymer of 2,2 bis (p-hydroxyphenyl propane) and epichlorohydrin, 3% by weight of "Aroclor 1254" and 82% by weight of methyl ethyl ketone solvent. Before application to the cores, the composition had been aged at 140° C. for a period of three weeks. The coating was still found to be effective in reducing the vibrations to about one-tenth the amplitude experienced in uncoated cores.

*Example 11*

The coated array of Example 10 was then placed in an oven and was pulsed to test dampening over a range of 20° to 100° C. It was found that the dampening efficiency of the composition was reduced at high temperatures in the range of 100° C., but that upon returning to lower temperatures in the range of 20° to 50° C., the dampening effect of the coating was restored.

It can be seen from the above Examples 10 and 11 that the compositions of the present invention have remarkable ability to dampen vibrations in ferirte cores even under extreme conditions. For example, the accelerated aging described in Example 10 is estimated to be the equivalent of aging for a number of years at 40° C., a normal operating temperature for magnetic memory arrays of the type in question. It was seen that this extended aging had no adverse effect on the dampening efficiency of the present coating compositions.

Likewise, as borne out by the results of Example 11, should the present coating compositions incidentally or accidently be heated to relatively high temperatures on the order of 100° C. with a resulting temporary decrease in their dampening efficiency, this efficiency is immediately restored upon return of the temperature to normal operating levels.

Having described the invention in terms of various illustrative embodiments, it will be apparent to those skilled in the art that various modifications may be made in the methods and products described herein without departing from the spirit of the invention or from the scope of the following claims.

What is claimed is:

1. A method for dampening the vibrations caused by magnetostrictive resonance in a ferrite magnetic core comprising coating said core with a solution of 2,2' bis (p-hydroxyphenyl propane)-epichlorohydrin polymer and chlorinated biphenyl dissolved in an a volatile organic solvent and evaporating said solvent to deposit an uncured film of said polymer and said chlorinated biphenyl on the surface of said ferrite core, said film comprising from 80% to 97% by weight of said polymer and from 3% to 20% by weight of said chlorinated biphenyl.

2. The method of claim 1 wherein said volatile organic solvent is methyl ethyl ketone.

3. The method of claim 1 wherein said chlorinated biphenyl is a yellow, viscous, liquid mixture of chlorinated biphenyls, said mixture containing 54% by weight of chlorine, and having an acid number of 0.015, a density of 12.83 lbs./gal. at 25° C., a distillation range of from 365° to 390° C., a pour point of 10 and a refractive index of 1.640.

4. A method for dampening the vibrations caused by magnetostrictive resonance in a ferrite core comprising coating said core with a solution of 2,2′ bis (p-hydroxyphenyl propane)-epichlorohydrin polymer, chlorinated biphenyl, and an anti-oxidant dissolved in a volatile organic solvent and evaporating said solvent to deposit an uncured film of said polymer, said chlorinated biphenyl and said anti-oxidant on the surface of said ferrite core, said film comprising from 80% to 97% by weight of said polymer and from 3% to 20% by weight of said chlorinated biphenyl.

5. The method of claim 4 wherein said volatile organic solvent is methyl ethyl ketone.

6. The method of claim 4 wherein said coating is applied by dipping said core in said solution.

7. A ferrite core characterized by low magnetostrictive amplitude when subjected to high speed operation in a magnetic memory array comprising a ferrite core and an uncured film coated on the surface of said core, said film comprising from 80% to 97% by weight of 2,2′ bis (p-hydroxyphenyl propane)-epichlorohydrin polymer and from 3% to 20% by weight of chlorinated biphenyl.

8. A magnetic memory array characterized by low magnetostrictive amplitude when subjected to high speed operation comprising a plurality of ferrite cores as defined in claim 7.

9. A ferrite core characterized by low magnetostrictive amplitude when subjected to high speed operation in a magnetic memory array comprising a ferrite core and an uncoated film coated on the surface of said core, said film comprising from 80% to 97% by weight of 2,2′ bis (p-hydroxyphenyl propane)-epichlorohydrin polymer, from 3% to 20% by weight of chlorinated biphenyl and an anti-oxidant.

References Cited by the Examiner

UNITED STATES PATENTS

| | | | |
|---|---|---|---|
| 2,467,101 | 4/1949 | Walters | 175—21 |
| 2,846,655 | 8/1958 | Iverson | 333—34 |
| 3,058,844 | 10/1962 | Johnson et al. | 117—132 |
| 3,198,657 | 8/1965 | Kimball et al. | 117—101 |
| 3,213,432 | 10/1965 | Samson et al. | 340—174 |

OTHER REFERENCES

Rajchman, Jan A.: "Computer Memories A Survey of the State-of-the-Art," Proc. of the IRE, January 1961, pp. 104–27.

IBM Technical Disclosure Bulletin, vol. 4, No. 1, June 1961.

WILLIAM D. MARTIN, *Primary Examiner.*

WILLIAM D. HERRICK, *Assistant Examiner.*

UNITED STATES PATENT OFFICE
CERTIFICATE OF CORRECTION

Patent No. 3,279,945

October 18, 1966

Robert S. Haines et al.

It is hereby certified that error appears in the above numbered patent requiring correction and that the said Letters Patent should read as corrected below.

Column 1, line 16, for "effects caused by high speed operation" read -- ringing in such cores and arrays --; column 3, line 50, for "contract" read -- contrast --; column 4, line 9, for "indivdual" read -- individual --; column 8, line 7, for "uncoated" read -- uncured --.

Signed and sealed this 12th day of September 1967.

(SEAL)
Attest:

ERNEST W. SWIDER
Attesting Officer

EDWARD J. BRENNER
Commissioner of Patents